United States Patent [19]

Inada et al.

[11] Patent Number: 5,301,546
[45] Date of Patent: Apr. 12, 1994

[54] MISFIRE DETECTING DEVICE FOR INTERNAL COMBUSTION ENGINE

[75] Inventors: Masanori Inada; Akira Demizu; Akihiro Nakagawa, all of Hyogo, Japan

[73] Assignee: Mitsubishi Denki K.K., Tokyo, Japan

[21] Appl. No.: 834,363

[22] Filed: Feb. 12, 1992

[30] Foreign Application Priority Data

Feb. 18, 1991 [JP] Japan .................................... 3-22486
Mar. 25, 1991 [JP] Japan .................................... 3-60222

[51] Int. Cl.$^5$ .......................................... G01M 15/00
[52] U.S. Cl. .................................................. 73/117.3
[58] Field of Search ................ 73/116, 117.3; 123/419

[56] References Cited

U.S. PATENT DOCUMENTS 5,088,318  2/1992  Osawa ................................. 73/117.3
5,105,657  4/1992  Nakaniwa .......................... 73/117.3

FOREIGN PATENT DOCUMENTS 58-19532  2/1983  Japan .
62-26345  2/1987  Japan .

*Primary Examiner*—Jerry W. Myracle
*Attorney, Agent, or Firm*—Sughrue, Mion, Zinn, Macpeak & Seas

[57] ABSTRACT

In a misfire detecting device for an internal combustion engine, a crank angle detector detects the crank angle of the engine, a speed detector detects the speed of the engine from the crank angle thus detected, a load detector detects the load of the engine from the speed thus detected; and a misfire detector detects the misfire rate of the engine from the load thus detected, and outputs a misfire detection signal when the misfire rate thus detected exceeds a misfire rate determining value set according to a certain amount of load.

4 Claims, 7 Drawing Sheets

MISFIRE DETECTING DEVICE FOR INTERNAL COMBUSTION ENGINE

BACKGROUND OF THE INVENTION

1. Field of the Invention

This invention relates to a misfire detecting device for an internal combustion engine which detects a misfire which occurs in the engine for instance when the ignition system is out of order.

2. Prior Art

For instance when, in an internal combustion engine, the ignition system becomes out of order, a large quantity of gas is discharged, so that the catalyst generates an abnormally high temperature. In order to prevent this difficulty, a device has been proposed in the art which detects the variation of an operating parameter, such as the angular speed of the crank shaft of the internal combustion engine or the cylinder internal pressure, representing the state of combustion, thereby to inform the operator of the abnormal condition by means of an alarm lamp or the like. Conventional misfire detecting devices of this type have been disclosed by Japanese Patent Application (OPI) No's 19532/1983 and 26345/1987 (the term "OPI" as used herein means an "unexamined published application").

The device disclosed by the aforementioned Japanese Patent Application (OPI) No. 19532/1983 operates as follows: When the difference between the crank shaft's angular speeds before and after the stroke of expansion in the internal combustion engine is smaller than a predetermined value, it is determined that a misfire has occurred. On the other hand, the device disclosed by the Japanese Patent Application (OPI) No. 26345/1987 operates as follows: The cylinder internal pressure of the engine is detected with a cylinder internal pressure sensor, and a crank angle is obtained with which the cylinder internal pressure is maximum. When the crank angle is within a predetermined crank angle range, it is determined that the combustion is normal.

That is, it is determined from the angular speed of the crank shaft or the cylinder internal pressure every combustion cycle whether the combustion is normal or the misfire occurs, and when a misfire occurrence rate (the frequency of occurrence of misfires per 100 combustion cycles or 100 revolutions of the engine) is larger than a predetermined value, a misfire detection signal is produced to turn on an alarm lamp or the like.

The conventional misfire detecting device is designed as described above. Hence, in the device, in order to prevent the generation of the abnormally high temperature by the catalyst due to misfires, or in order to make protection even in the operation highest both in speed and in load which is most greatly affected by misfires, a low threshold value is provided for determination of the misfire occurrence rate; that is. the sensitivity of detection is decreased.

Therefore, even in a low speed and low load operation in which the rotation is liable to be changed by factors other than the misfire for instance as in the case where an internal combustion engine operated vehicle is shocked or vibrated during traveling, and in which no actual damage occurs even when misfires occur to the extent that the misfire occurrence rate exceeds the criterion, the misfire detection signal is erroneously produced. That is, the misfire detecting operation is low in reliability.

Furthermore, the misfire detecting device disclosed by the aforementioned Japanese Patent Application (OPI) No. 19532/1983 is so designed as to detect misfires in all the operating conditions. When the load of the internal combustion engine is considerably light as in the case where it is run at high speed with no load, the friction loss of the internal combustion engine is small, or the inertial energy is large, and therefore the variation in angular speed of the crank shaft due to misfires is smaller than in the case where the load is heavy. As a result, it is impossible for the device to accurately detect misfires, or, even if the detection sensitivity is increased, misfires are erroneously detected because of external noises. That is, the result of detection provided by the misfire detecting device is low in reliability. Hence, for instance in the case where the device is coupled to a display unit, to indicate a failure in the ignition system according to the result of detection, to inform the operator of it thereby to request for repair, the following difficulties may be involved: Although the combustion is abnormal, it is not indicated; or although the combustion is normal, it is indicated as abnormal. That is, the operator cannot rely on the indication based on the result of detection provided by the device.

SUMMARY OF THE INVENTION

Accordingly, an object of this invention is to eliminate the above-described difficulties accompanying a conventional misfire detecting device.

More specifically, an object of the invention is to provide a reliable misfire detecting device for an internal combustion engine which detects misfires only when necessary, and which is free from the difficulty that a detection output is erroneously provided when the engine is liable to be varied in rotation; that is, when misfires are liable to be erroneously detected.

A misfire detecting device according to an aspect of the invention comprises: misfire detecting means for setting a misfire rate determining value according to a load given to the internal combustion engine, and outputting a misfire detection signal when a misfire rate detected exceeds the misfire rate determining value.

In the device, the misfire detecting means controls the misfire rate determining value in such a manner that it is increased when the load of the engine is light and decreased when heavy; that is, it sets the misfire rate determining value to a most suitable value according to the load of the engine, and outputs the misfire detection signal when the misfire rate of the engine exceeds the most suitable value thus set.

A misfire detecting device according to another aspect of the invention comprises: load detecting means for detecting a load given to the internal combustion engine; and means for inhibiting misfire detecting means to detect a misfire or nullifying the detection of a misfire done by the misfire detecting means when the load is lower than a predetermined value.

Another example of the misfire detecting device of the invention comprises: load detecting means for detecting a load given to the internal combustion engine; display means for displaying the detection of a misfire performed by the misfire detecting means; and means for inhibiting the display of the detection of a misfire when the load is smaller than a predetermined value.

In the misfire detecting device of the invention, when the load of the internal combustion engine is lower than the predetermined value; that is, when the load is light, the display of the detection of a misfire is inhibited. Hence, the device is free from the difficulty that the occurrence of a misfire is erroneously detected.

The nature, utility and principle of the invention will be more clearly understood from the following detailed description and the appended claims when read in conjunction with the accompanying drawings.

DETAILED DESCRIPTION OF THE PREFERRED EMBODIMENTS

Preferred embodiments of this invention will be described with reference to the accompanying drawings.

First, an example of a misfire detecting device for an internal combustion engine, which constitutes a first embodiment of the invention, will be described with reference to FIGS. 1 and 2.

Figure 1:
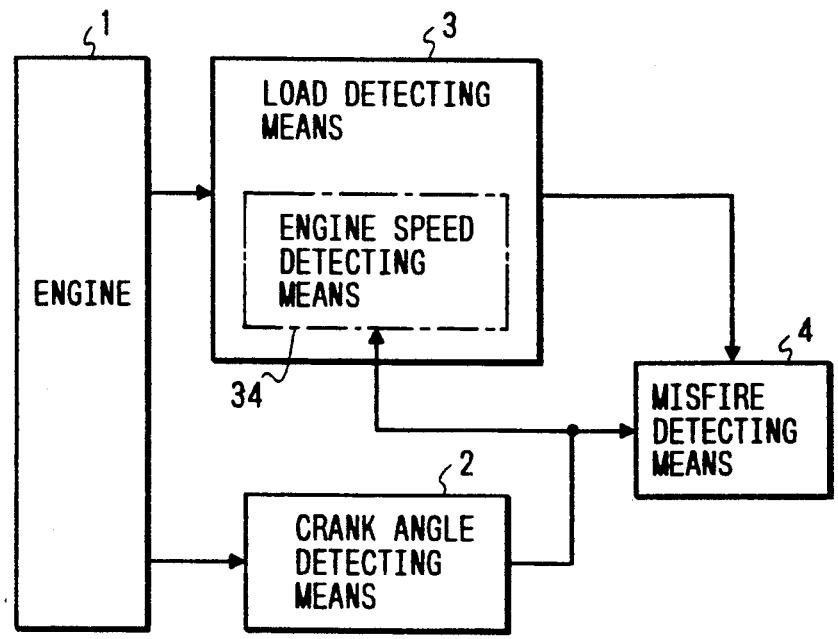
FIG. 1 is a block diagram showing an example of a misfire detecting device for an internal combustion engine according to the invention.
Figure 2:
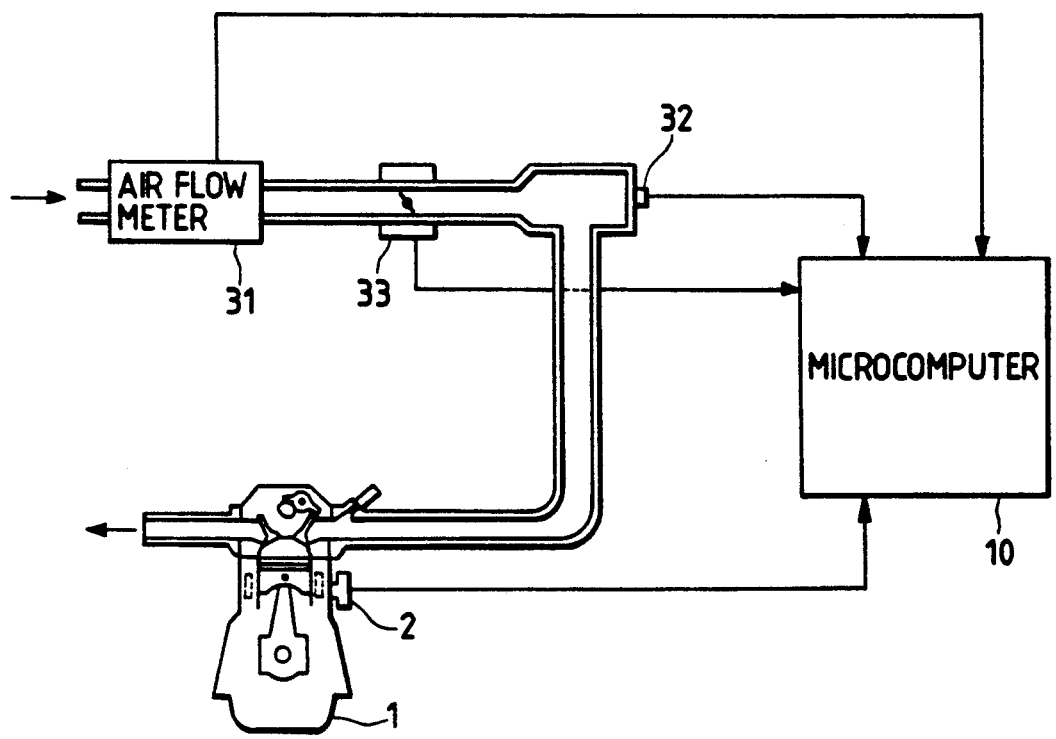
FIG. 2 is an explanatory diagram for a description of the arrangement of an internal combustion engine to which the misfire detecting device shown in FIG. 1 is applied.

In FIGS. 1 and 2, reference numeral 1 designates an engine; and 2, crank angle detecting means for outputting a pulse signal when the crank angle is at a reference angular position (for instance the top dead center) or angular positions forming a predetermined angle (for instance 45° CA (crank angle)) before and after the reference angular position.

The crank angle detecting means 2, as shown in FIG. 2, is provided on the engine so as to detect the rotation of the crank.

Further in FIG. 1, reference numeral 3 designates load detecting means; and 4, misfire detecting means. The load detecting means is to detect the load of the engine 1. More specifically, the load detecting means may be an air flow meter 31, a suction pipe pressure sensor 32, or a throttle degree-of-opening sensor 33 which are shown in FIG. 2, or engine speed (number-of-revolutions per minute) detecting means 34 which measures the period of the predetermined crank angles, for instance, from a reference angular position signal provided by the crank angle detecting means 2, to detect the number of revolutions per minute of the engine. The misfire detecting means 4 operates to determine, based on a signal provided by the load detecting means 3, whether or not it is necessary to perform a misfire detecting operation. The misfire detecting means 4 further operates according to a signal from the crank angle detecting means 2, to calculate, with the crank angle's reference angular position as a reference, the ratio of the times required for the predetermined angular intervals before and after the reference angular position, thereby to detect the occurrence of a misfire.

The above-described engine speed detecting means 34 and the misfire detecting means 4 are included in a microcomputer 10 shown in FIG. 2. The microcomputer 10 includes: an input interface for inputting signals from the air flow meter 31, the suction pipe pressure sensor 32, the throttle degree-of-opening sensor 33, and the crank angle detecting means 2; a single chip microcomputer incorporating an A/D (analog-to-digital) converter for converting input analog signals into digital signals, and a timer counter (or free running counter) which counts up every predetermined time clock signal; and memories (ROM and RAM).

Now, the operation of the misfire detecting device thus organized will be described.

Figure 3:
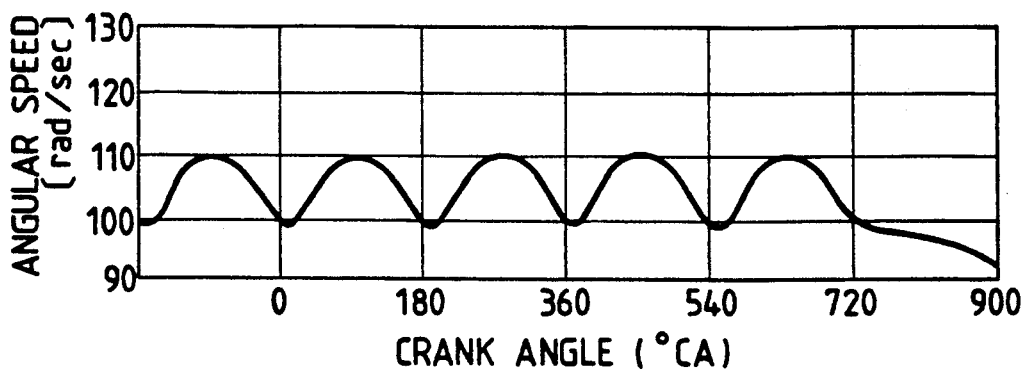
FIG. 3 is a waveform diagram showing angular speeds in the case where a 4-cycle 4-cylinder engine is under heavy load, for a description of the misfire detecting device shown in FIG. 1.
Figure 4:
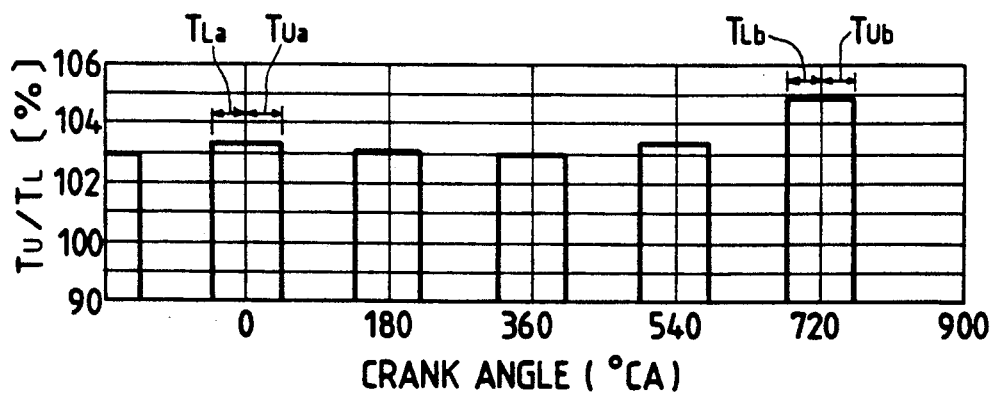
FIG. 4 is a waveform diagram showing the ratio of the times required for predetermined crank angular intervals before and after the top dead center in the stroke of combustion in the case where the 4-cycle 4-cylinder engine operates under heavy load, for a description of the misfire detecting device shown in FIG. 1.
Figure 5:
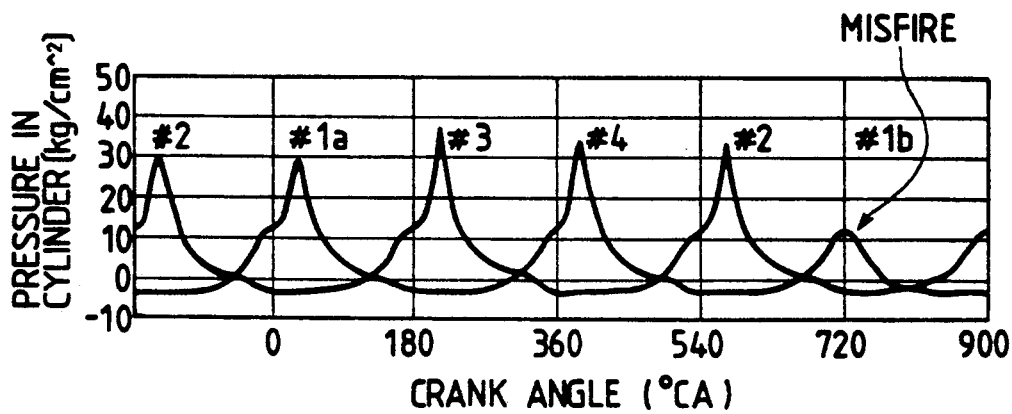
FIG. 5 is a waveform diagram showing the internal pressures in the cylinders in the case where the 4-cycle 4-cylinder engine operates under heavy load, for a description of the misfire detecting device shown in FIG. 1.

First, the fundamental principle of detecting misfires will be described with reference to FIGS. 3, 4 and 5. FIG. 3 shows angular speeds when a 4-cycle 4-cylinder engine operates under heavy load (the throttle being fully opened, with a speed of 1000 rpm). FIG. 4 shows the ratio (TU/TL) of the times required for the predetermined crank angle intervals before and after the top dead center in the stroke of compression when the engine operates under heavy load. FIG. 5 shows the internal pressures of the cylinders during the operation with heavy load.

The ratio TU/TL shown in FIG. 4 is obtained with the top dead center in the stroke of compression as a reference. That is, it is the ratio of the time TL required for a predetermined angular interval (for instance 45° CA interval) before the top dead center to the time TU required for a predetermined angle interval (for instance 45° CA interval) after the top dead center. The waveform shown in FIG. 4 is such that, during a combustion cycle, combustion is made normally in the #1,

2, #3 and #4 cylinders, and thereafter a misfire occurs in the #1 cylinder for some reason, for instance a failure in the ignition system.

If it is assumed that, as shown in FIGS. 4 and 5, the #1 cylinder in which combustion is made normally is designated by #1a, and the time ratio is TUa/TLa, whereas the #1 cylinder in which a misfire occurs is designated by #1b, and the time ratio is TUb/TLb, then it can be seen that TUb/TLb is larger than TUa/TLb. This is due to the following fact: When combustion is made normally, the interval requiring TLa is in the stroke of compression with the angular speed decreased as shown in FIG. 3, and the interval requiring TUa is in the stroke of explosion, with the angular speed increased; whereas when a misfire occurs, TLb is similar to TLa, and as for the interval requiring TUb, the angular speed is further decreased, and the time TUb is increased.

As is apparent from the above description, the time ratio TU/TL of the cylinder where a misfire occurs is larger than that of the same cylinder where combustion is made normally. This is detected, to determine it every combustion cycle whether or not a misfire has occurred.

This misfire detecting operation will be concretely described with reference to FIGS. 6 through 9, flow charts showing the arithmetic operations of the computer 10. In the concrete example, with a predetermined crank angle (for instance the top dead center in the stroke of compression) as a reference angle, measurement is made for the time required for a predetermined angular interval (for instance 45° CA interval) before the reference angle and the time required for a predetermined angular interval (for instance 45° CA interval) after the reference angle, and a misfire is detected from the ratio of the times thus measured.

Figure 6:
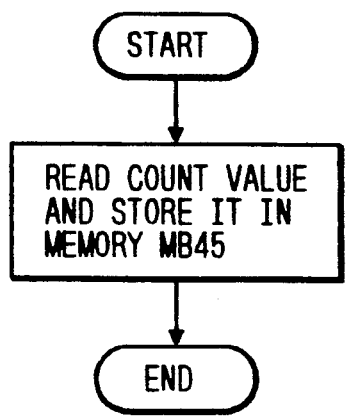
FIG. 6 is a flow chart for a description of the operation of the misfire detecting device shown in FIG. 1 in the case where an interruption is performed according to the output signal of crank angle detecting means to read and store a count value whenever the crank angle reaches 45° CA before the top dead center in the stroke of compression.

In FIG. 6, an interruption is made in response to a signal from the crank angle detecting means 2, so that the count value of the counter which counts up every predetermined time clock signal is stored in a memory buffer MB45 whenever the cranks angle reaches 45° CA before the top dead center in the stroke of compression.

Figure 7:
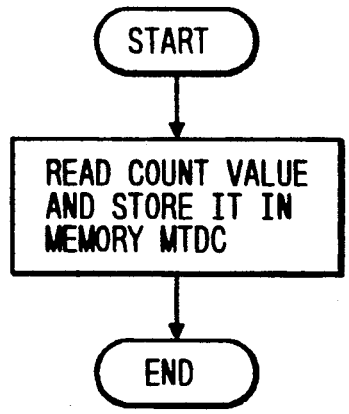
FIG. 7 is a flow chart for a description of the operation of the misfire detecting device shown in FIG. 1 in the case where an interruption is performed according to the output signal of the crank angle detecting means to read and store a count value whenever the crank angle reaches the top dead center in the stroke of compression.

In FIG. 7, an interruption occurs in response to a signal from the crank angle detecting means 2, so that the count value of the counter which counts up every predetermined time clock signal is stored in a memory buffer MTDC whenever the crank angle reaches the top dead center in the stroke of compression. Those values stored in the memory buffers MB45 and MTDC indicate the time instants corresponding to the 45° CA before the top dead center and the top dead center, respectively.

Figure 8:
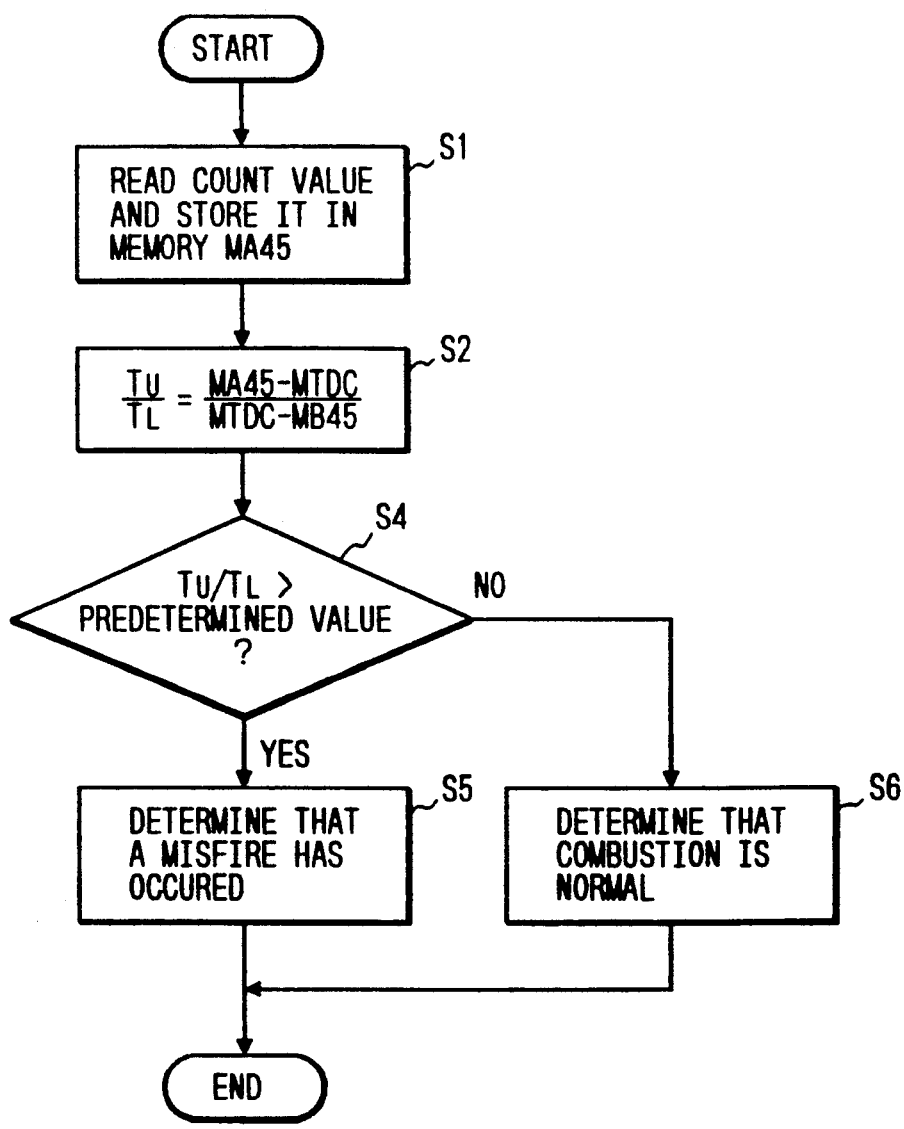
FIG. 8 is a flow chart indicating an interruption processing operation which is carried out whenever the crank angle reaches 45° CA after the top dead center in the stroke of compression, for a description of the operation of the misfire detecting device shown in FIG. 1.

FIG. 8 is a flow chart showing arithmetic operations Steps S1, S2, S4, S5 and S6 which are carried out whenever the crank angle reaches 45° CA after the top dead center in the stroke of compression.

In Step S1 of FIG. 8, the above-described count values of the timer counter stored through interruption are read and stored in a memory buffer MA45. In Step S2, the time ratio TU/TL is obtained from the following Equation (1):

$$TU/TL = (MA45 - MTDC)/(MTDC - MB45) \quad (1)$$

In Equation (1), (MA45−MTDC) is the time required for the interval from the top dead center to 45° CA after the top dead center, and (MTDC−MB45) is the time required for the interval from 45° CA before the top dead center to the top dead center.

After the calculation of the time ratio TU/TL, Step S4 is effected. In Step S4, it is determined whether or not the time ratio TU/TL obtained in Step S2 is larger than a predetermined value corresponding to the occurrence of a misfire. When it is larger ("Yes"), Step S5 is effected; that is, it is determined that a misfire has occurred with the cylinder. Thus, the operation is ended. When it is not larger, Step S6 is effected, so that it is determined that combustion is normal in the cylinder, and the operation is ended.

If summarized, with a predetermined crank angle as a reference crank angle, the ratio of the time required for a predetermined angular interval before the reference crank angle to the time required for a predetermined angular interval after the reference crank angle is obtained, and it is determined from the ratio of the times thus obtained whether a misfire has occurred or not.

Figure 9:
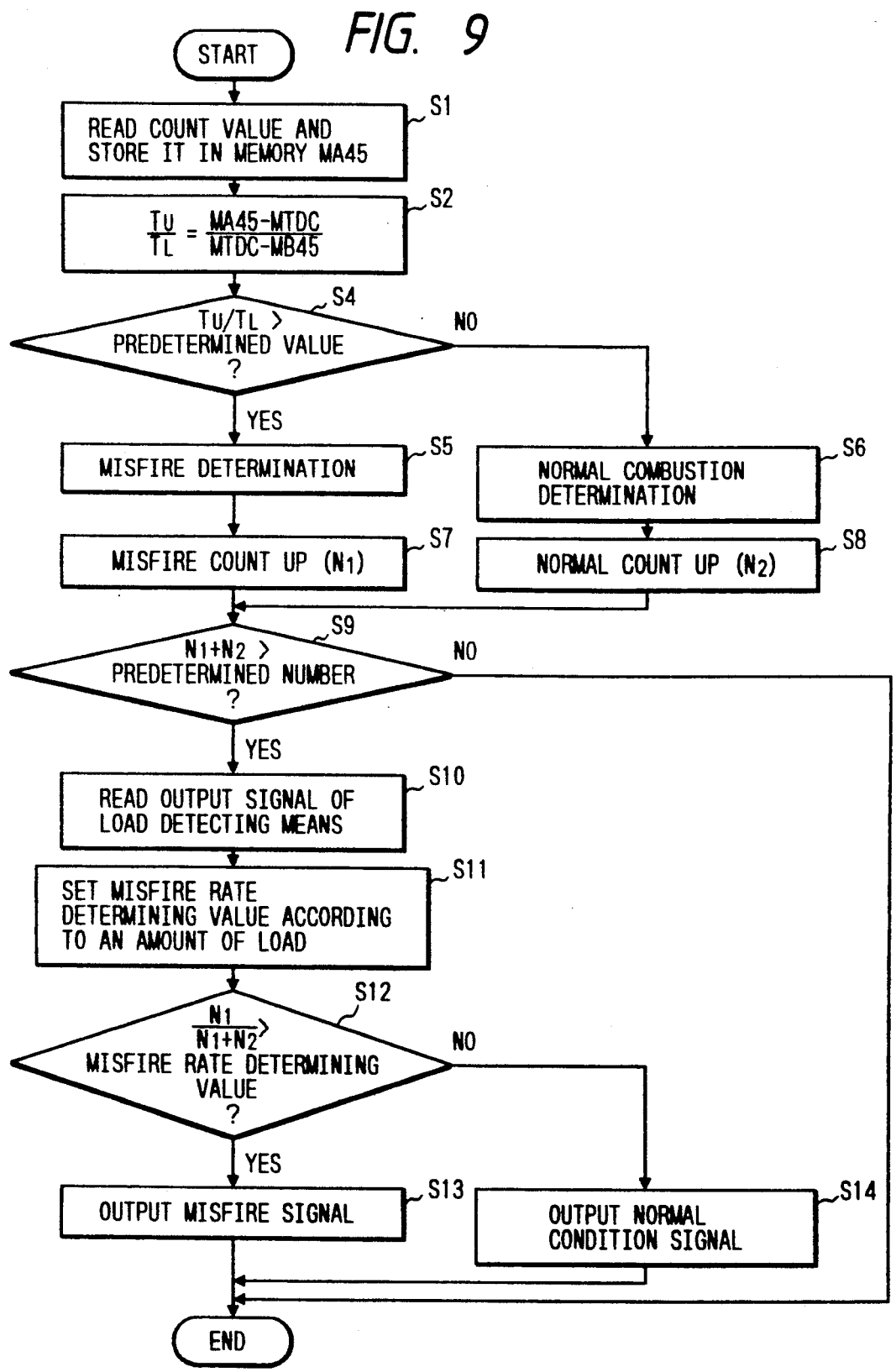
FIG. 9 is a flow chart for a description of the entire operation of the misfire detecting device.

The operation of the misfire detecting device thus organized will be described in its entirety with reference to FIG. 9. a flow chart. In FIG. 9, Steps 1 through 6 are the same as those in FIG. 8. That is, after it is determined in Step S5 of FIG. 8 that a misfire has occurred, Steps S7 and the following Steps are carried out. When, in response to the result of comparison in Step S4, it is determined in Step S5 that a misfire has occurred, Step S7 is effected. In Step S7, the count value N1 of a misfire counter adapted to count each misfire determination is increased. On the other hand, when it is determined in Step S6 that the combustion is normal, the count value N2 of a normal combustion counter adapted to count each normal combustion determination.

Thereafter, Step S9 is effected. In Step S9, the count values N1 and N2 are subjected to addition, and it is determined where or not the sum (N1+N2) reaches a predetermined number of combustion cycles, for instance 100 combustion cycles. When it is smaller than the predetermined number of combustion cycles, the misfire determining operation is ended, and the above-described Step S1 is started with the interruption effected in response to the next output signal of the crank angle detecting means 2.

When it is determined in Step S9 that the sum (N1+N2) has reached the predetermined number. Step S10 is effected. In Step S10, the output signal of the load detecting means is read. In the following Step S11, a misfire rate determining value is set according to an amount of load given.

Next, in Step S12, the misfire rate determining value is compared with an actual misfire rate N1/(N1+N2) which is obtained from a misfire determination result. When it is determined that the actual misfire rate N1/(N1+N2) is larger than the misfire rate determining value, Step S13 is effected to output a misfire signal. When, in Step S12, it is determined that the former is smaller than the latter, Step S14 is effected to output a normal condition signal.

In the above-described embodiment, when it is determined in Step S9 that (N1+N2) is larger than the predetermined number of combustion cycles, in Step S12 the misfire rate N1/(N1+N2) with respect to (N1+N2) combustion cycles is compared with the misfire rate determining value. However, the same effect can be obtained by determining the number of misfires occurring during a predetermined number of revolutions, for instance 100 revolutions.

As was described above, in the embodiment of the invention, in Step S11 of FIG. 9, the misfire rate determining value is set to a most suitable value so that, during a heavy load operation in which the catalyst generates abnormally high temperatures even with a low misfire rate, the misfire rate determining value is set to a low value, and during a light load operation in which no trouble occurs even with a high misfire rate, the misfire rate determining value is set to a high value. Hence, with the device of the invention, the misfire detection signal is produced only when necessary. Furthermore, the device produces no output erroneously even in the condition that, as in the case where the vehicle is run at low speed with light load, the rotation is liable to be changed by factors other than the misfire, and the misfire detection signal is liable to be erroneously produced. Thus, the misfire detecting device of the invention is high in reliability.

Now, another example of the misfire detecting device, which constitutes a second embodiment of the invention, will be described with reference to FIG. 10, a flow chart.

In Step S7, the output of the load detecting means 3 is read. In the following Step S8, it is determined whether or not the detected engine load is greater than a predetermined value. When it is determined that the detected engine load is greater than the predetermined value, Step S9 is effected to perform a misfire detection. Thereafter, the above-described misfire detecting operation, Steps S1 through S6 in FIG. 8, is carried out. When it is determined that the detected load is equal to or smaller than the predetermined value, Step S10 is effected to inhibit the misfire detecting operation, and the routine is ended.

Figure 10:
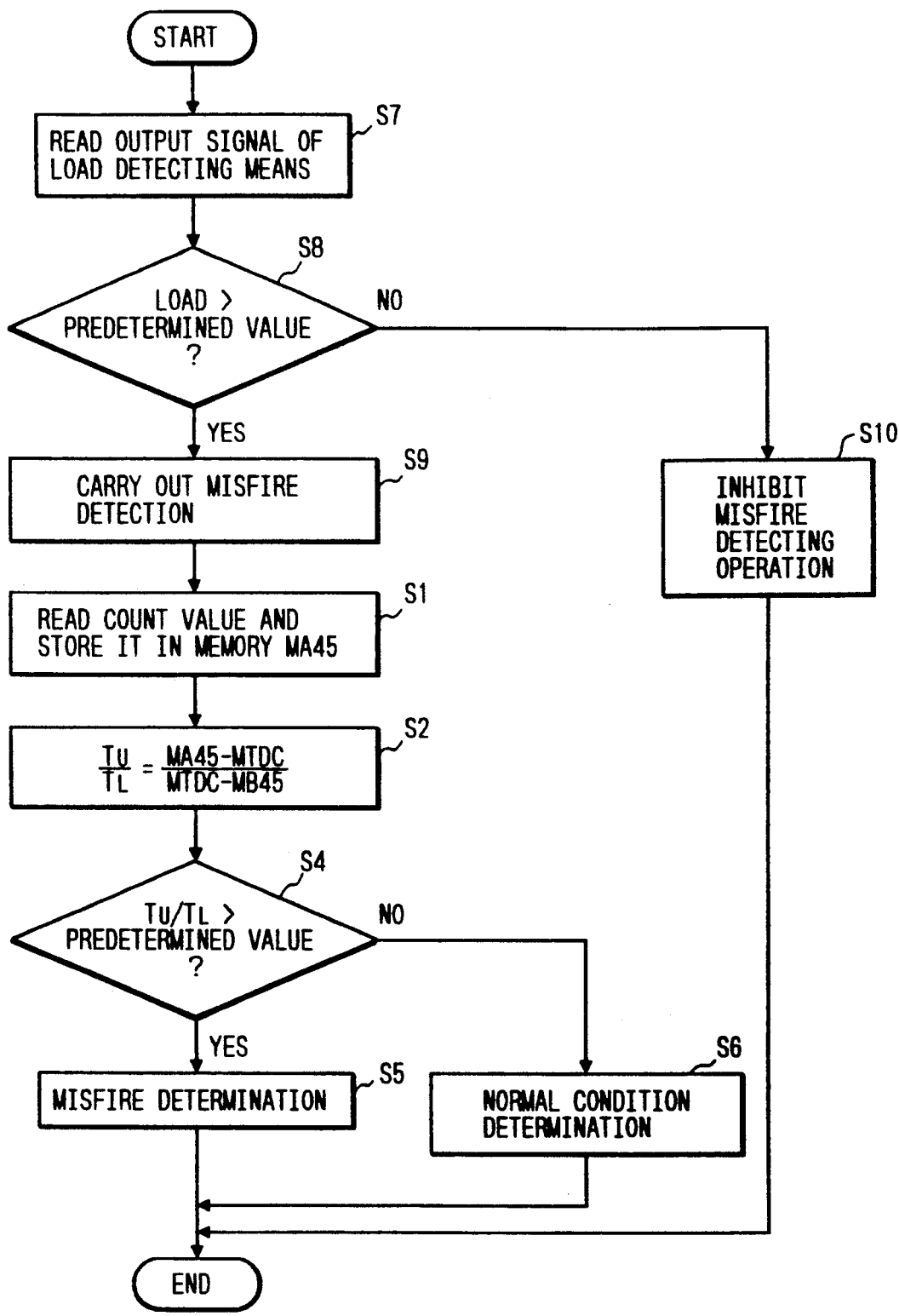
FIG. 10 is a flow chart for a description of the operation of a first example of a misfire detecting device according to another aspect of the invention.

In the second embodiment shown in FIG. 10, the engine load is detected, and when the load thus detected is equal to or smaller than the predetermined value, the misfire detecting operation is inhibited. This method may be replaced by the following method in which the load detection and the misfire detection are changed in the order of execution, and the misfire detection is carried out every period, and in the case when the load detected is equal to or smaller than the predetermined value, the misfire detection in that period is nullified. The misfires occurring in the internal combustion engine which is run with light load scarcely provides adverse effects; for instance, they will not adversely affect the exhaust gas.

Figure 11:
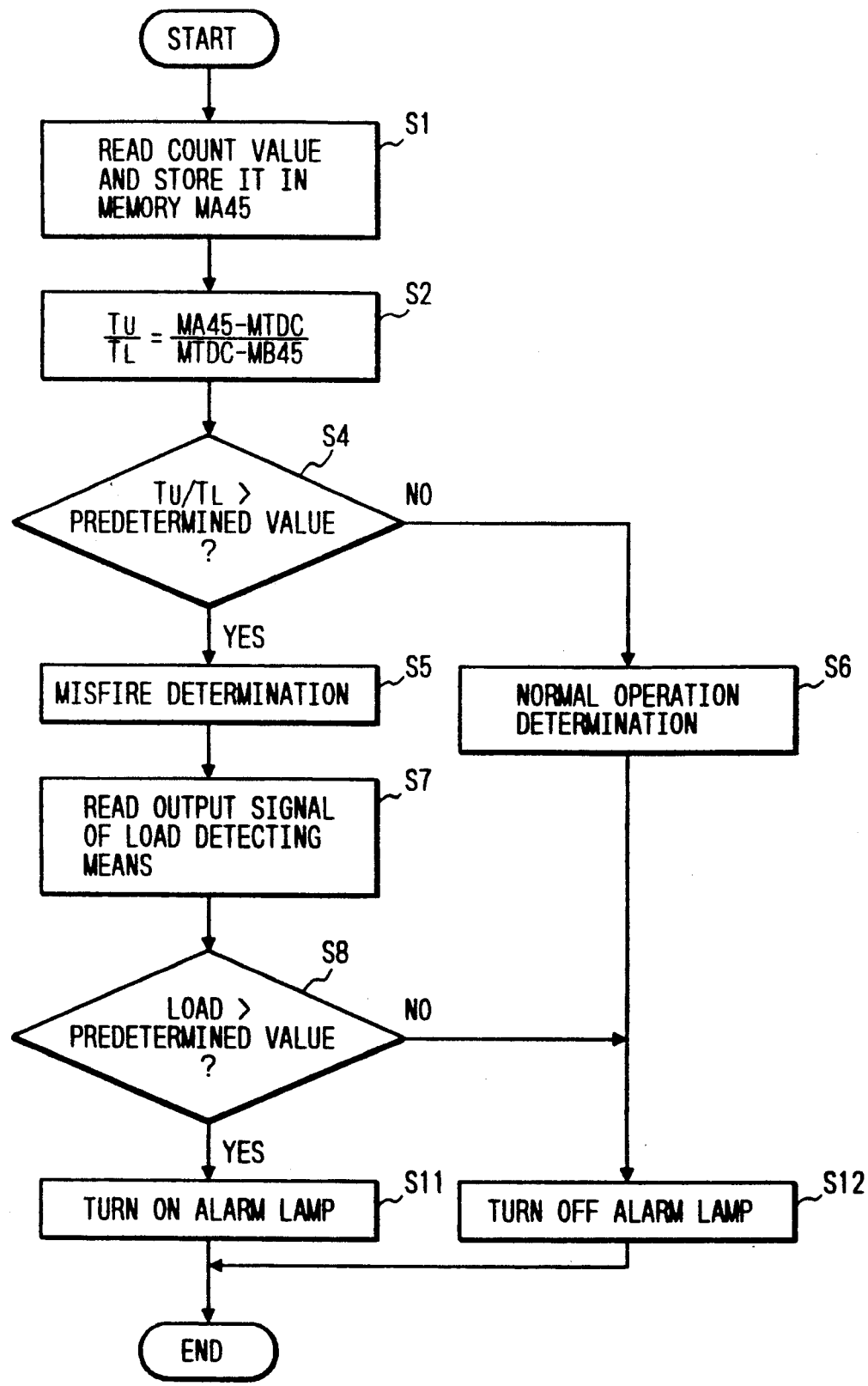
FIG. 11 is also a flow chart for a description of the operation of a second example of the misfire detecting device shown in FIG. 10.

Another example of the misfire detecting device, a third embodiment of the invention, will be described with reference to FIG. 11, a flow chart.

In Steps S1 through S6, the above-described misfire detecting operation is carried out. When it is determined in Step S5 that a misfire has occurred, Step S7 is effected to read the output of the load detecting means 3. When it is determined in Step S8 that the engine load detected is larger than a predetermined value, Step S11 is effected to turn on an alarm lamp to indicate the occurrence of misfire. In the case where the engine load is equal to or smaller than the predetermined value, Step S12 is effected to turn off the alarm lamp. When it is determined also in Step S6 that the combustion is normal, the alarm lamp is turned off.

That is, the third embodiment is so designed that, during a light load operation in which a misfire cannot be accurately detected, the alarm lamp is not turned on. Thus, with the device, the indication of misfire detections is high in reliability.

In the above-described embodiments, the detection of a misfire depends on whether or not the ratio of the times required for the predetermined angular intervals before and after the top dead center in the stroke of compression is larger than the predetermined value. However, it should be note that the invention is not limited thereto or thereby. That is, the technical concept of the invention can be applied to the case where the detection of a misfire is performed according to the difference between the crank shaft angular speeds provided before and after the stroke of expansion in the internal combustion engine, or the case where a misfire is detected from detection of the angular speed of the crank shaft.

As is apparent from the above description, based on the fact that the occurrence of misfires depends on the load applied to the internal combustion engine, the misfire detecting device is so designed that the misfire rate determining value is controlled according to the load, and, when the misfire rate of the internal combustion engine exceeds the misfire rate determining value, it is determined that a misfire has occurred. Hence, the device is free from the difficulty that the misfire detection signal is produced when unnecessary, or, although no misfire has occurred, the misfire detection signal is outputted by factors other than misfires. Thus, the misfire detecting device is high in reliability.

While there has been described in connection with the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A misfire detecting device for an internal combustion engine, comprising:
   first detection means for detecting a variation of an operating parameter representing a state of combustion in said internal combustion engine;
   second detection means for detecting an amount of a load given to said internal combustion engine;
   means for setting a misfire rate determining value according to an amount of load of said internal combustion engine; and
   third detection means for determining a misfire rate for said internal combustion engine from the amount of said load detected by said second detection means and the variation of said operating parameter detected by said first detection means, to output a misfire detection signal when said misfire rate exceeds said misfire rate determining value set by said setting means.

2. A misfire detecting device as claimed in claim 1, wherein said setting means sets a low misfire rate determining value during a heavy load of said internal combustion engine, and a high misfire rate determining value during a light load of said internal combustion engine.

3. A misfire detecting device for an internal combustion engine, comprising:
   misfire detecting means for detecting a misfire from an angular speed of a crank shaft in said internal combustion engine;
   load detecting means for detecting a load given to said internal combustion engine; and means for inhibiting or nullifying the detection of a misfire when said load is equal to or lower than a predetermined value.

4. A misfire detecting device for an internal combustion engine, comprising:

misfire detecting means for detecting a misfire from an angular speed of a crank shaft in said internal combustion engine;

load detecting means for detecting a load given to said internal combustion engine;

display means for displaying the detection of a misfire performed by said misfire detecting means; and means for inhibiting the display of said detection of a misfire when said load is equal to or smaller than a predetermined value.

* * * * *